May 17, 1966     H. C. McGINTY ETAL     3,251,977
GAS-SHIELDED ARC TORCH NOZZLE
Filed Feb. 18, 1964
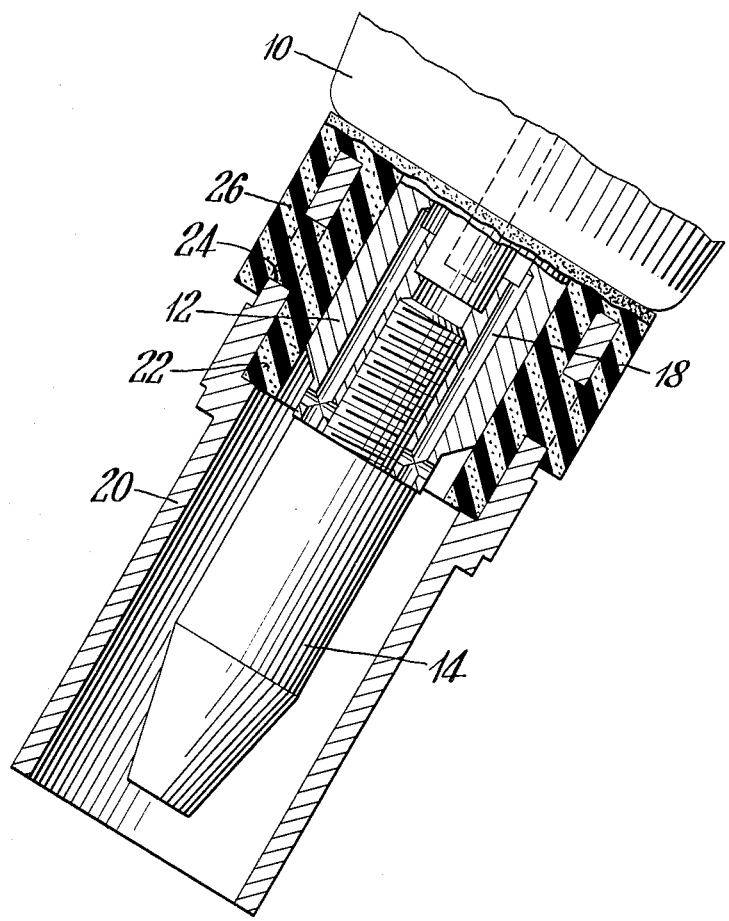
INVENTORS
HARRY C. McGINTY
THADDEUS J. WOJCIAK
BY Richard S. Shreve
ATTORNEY

United States Patent Office 3,251,977
Patented May 17, 1966

---

3,251,977
GAS-SHIELDED ARC TORCH NOZZLE
Harry C. McGinty, Belleville, and Thaddeus J. Wojciak, Clark, N.J., assignors to Union Carbide Corporation, a corporation of New York
Filed Feb. 18, 1964, Ser. No. 345,764
5 Claims. (Cl. 219—75)

This invention relates to gas-shielded arc torch nozzles, and has for its principal object to provide a push-on, easily replaceable, low-cost, disposable nozzle for torches of the metal-arc or non-consumable electrode type.

The preferred embodiment of the invention comprises a metal outer sleeve into one end of which is molded a firmly anchored, modified elastomeric plastic bushing such as silicone rubber. This bushing, in addition to being an electrical insulator, acts also to center the outer sleeve with respect to the wire or electrode, as well as hold the nozzle to the torch. The threadless construction of this bushing permits the nozzle to be quickly assembled or removed without the need for turning it on and off as is required with the conventional screw-on type.

In the drawing, the single figure is a vertical cross-section through a torch provided with a nozzle according to the preferred embodiment of the invention.

As shown, the torch or gun comprises a body 10 having a barrel 12 with a bore receiving an electrode contactor 14, which may be a collet for gripping a non-consumable electrode, or a contact tip for a moving wire electrode. The body 10 has a lower cylindrical extension preferably formed by a depending portion of the barrel 12, which is provided with passages 18 for supplying shielding gas to the arc zone.

According to the present invention, a gas-directing nozzle is mounted on the lower portion of the barrel 12 and comprises a tubular shell 20 of metal or ceramic material. The upper portion of the inner wall of the shell 20 is lined with an annular cushion 22 of an elastomeric heat resistant plastic such as silicone rubber. The lined portion of the shell is indented, apertured or formed with projections to provide a mechanical interlock with the cushion material.

In the form shown, the upper portion of the shell 20 is drilled through to form holes 24, and the silicone rubber is molded over the inner wall, top and outer wall of the upper portion of the shell 20 and extends completely through the holes 24, connecting the inner cushion 22 with an outer cushion 26.

It should be noted that the inner diameter of the elastomeric cushion is less than the outer diameter of the barrel 12 so that the cushion is compressed when the cushion passes over the conical lower end of the barrel. This compression force effects the secure friction grip to hold the nozzle in place on the barrel, and yet enables the nozzle to be readily removed.

What is claimed is:
1. In a gas-shielded arc torch having a body with a depending cylindrical extension and an electrode contactor therein, a gas-directing nozzle comprising a tubular shell having a top facing said body and a bore receiving said electrode contactor in the upper portion thereof with the electrode depending therefrom in centered relation and a lower portion surrounding the electrode and forming the shielding gas chamber, and a coaxial layer of elastomeric heat resistant plastic material secured to the upper portion of the wall of said shell and frictionally engaging said cylindrical extension of said body to hold said nozzle thereon.

2. Gas-directing nozzle as claimed in claim 1, in which said layer is molded over the top of the upper portion of said shell.

3. Gas-directing nozzle as claimed in claim 1, in which said upper portion of said shell is constructed to form a mechanical interlock with said layer of plastic material.

4. Gas-directing nozzle as claimed in claim 2, in which said upper portion of said shell has apertures therethrough, and said layer is of silicone rubber molded over the top and through the apertures of said shell.

5. Gas-directing nozzle for use in a gas shielded arc torch having a body with a depending extension and an electrode contactor therein, said nozzle comprising a tubular shell having a top adapted to face said body and having apertures therethrough, and a bore adapted to receive said electrode contactor in the upper portion thereof with the electrode depending therefrom in centered relation and a lower portion adapted to surround the electrode and form a shielding gas chamber, and a coaxial layer of silicone rubber molded over the upper portion of said shell forming a layer inside and a layer outside of said shell connected by silicone rubber passing through said apertures in said shell.

References Cited by the Examiner
UNITED STATES PATENTS

| | | | |
|---|---|---|---|
| 2,555,017 | 5/1951 | Tuthill | 219—75 |
| 2,952,766 | 9/1960 | Craig et al. | 219—130 |
| 2,992,320 | 7/1961 | Hill | 219—75 |
| 3,121,784 | 2/1964 | McGinty et al. | 219—75 |

RICHARD M. WOOD, *Primary Examiner.*